(12) United States Patent
Reid et al.

(10) Patent No.: US 7,345,583 B2
(45) Date of Patent: Mar. 18, 2008

(54) DUAL SECURITY LABEL

(75) Inventors: Jeffrey Reid, Longford Mills (CA); Laura Wilkes, Georgetown (CA)

(73) Assignee: KMA Global Solutions Inc., Mississauga, Ontario (CA)

( * ) Notice: Subject to any disclaimer, the term of this patent is extended or adjusted under 35 U.S.C. 154(b) by 92 days.

(21) Appl. No.: 10/819,501

(22) Filed: Apr. 7, 2004

(65) Prior Publication Data

US 2004/0201478 A1    Oct. 14, 2004

Related U.S. Application Data

(60) Provisional application No. 60/461,238, filed on Apr. 8, 2003.

(51) Int. Cl.
*G08B 13/14*    (2006.01)
(52) U.S. Cl. .................. 340/568.1; 340/572.1
(58) Field of Classification Search ............ 340/568.1, 340/522, 572.1–572.9
See application file for complete search history.

(56) References Cited

U.S. PATENT DOCUMENTS

| | | | |
|---|---|---|---|
| 4,151,405 A | 4/1979 | Peterson | 235/382 |
| 4,581,524 A | 4/1986 | Hoekman et al. | 235/493 |
| 4,626,311 A | 12/1986 | Taylor | 156/308.2 |
| 4,717,438 A | 1/1988 | Benge et al. | 156/152 |
| 5,392,028 A * | 2/1995 | Pichl | 340/572.5 |
| 5,406,263 A | 4/1995 | Tuttle | 340/572 |
| 5,495,250 A | 2/1996 | Ghaem et al. | 342/51 |
| 5,583,489 A | 12/1996 | Loemker et al. | 340/572 |
| 5,614,278 A | 3/1997 | Chamberlain et al. | 428/41.4 |
| 5,859,587 A | 1/1999 | Alicot et al. | 340/572 |
| 5,939,984 A * | 8/1999 | Brady et al. | 340/572.1 |
| 5,982,284 A | 11/1999 | Baldwin et al. | 340/572.8 |
| 6,121,878 A | 9/2000 | Brady et al. | 340/572.1 |
| 6,154,137 A | 11/2000 | Goff et al. | 340/572.4 |
| 6,369,711 B1 | 4/2002 | Adams et al. | 340/572.1 |
| 6,404,341 B1 | 6/2002 | Reid | 340/572.8 |
| 6,603,399 B1 * | 8/2003 | Ruhrig | 340/572.1 |
| 6,690,279 B1 * | 2/2004 | Ruhrig et al. | 340/572.6 |
| 2004/0233042 A1 * | 11/2004 | Piccoli et al. | 340/10.1 |

FOREIGN PATENT DOCUMENTS

| | | |
|---|---|---|
| DE | 43 23 883 A1 | 1/1995 |
| EP | 0 446 910 A1 | 9/1991 |
| EP | 2 701 146 | 2/1993 |
| EP | 0 858 061 A2 | 8/1998 |
| FR | 2 701 146 | 3/1993 |
| GB | 2 310 977 | 9/1997 |
| WO | WO 99/14717 | 3/1999 |

* cited by examiner

*Primary Examiner*—Phung T. Nguyen
(74) *Attorney, Agent, or Firm*—Hodgson Russ LLP (57) ABSTRACT

A dual security label comprising a cover stock body comprising a first side and a second side, with an adhesive on the second side of the cover stock body. A first antitheft device adhered to the adhesive and a second antitheft device adhered to the adhesive. The exposed adhesive used for adhering the dual security label to products being sold by retailers or used for adhering to an enclosing member.

21 Claims, 6 Drawing Sheets

DUAL SECURITY LABEL

CROSS REFERENCE TO RELATED APPLICATION

This application claims the benefit of Provisional U.S. Patent Application No. 60/461,238 to Reid et al., filed on Apr. 8, 2003.

BACKGROUND

Shoplifting is a problem that plagues retailers. In order to combat shoplifting, retailers have demanded antitheft devices or security devices be placed on the consumer products they sell. This has, however, caused many manufacturers to carry a plurality of inventories of the identical product. This is because of the plurality antitheft technologies currently in use in market place, and because some products do not carry any antitheft device and there is no need to expend money equipping these products with antitheft devices.

For example, a manufacturer makes product A and places a first type of antitheft device on it for a first retailer, said first security device compatible with the security system in use at the business of the first retailer. Then, for a second retailer having a different type of security system, the manufacturer must use a second type of antitheft device in connection with product A that is different from the first antitheft device, yet compatible with the security system in use at the business of the second retailer. Additionally, the manufacturer must carry product A without any antitheft devices for a third retailer who has no security system and thus does not want to pay the added expense associated with antitheft devices.

Thus, these product manufacturers must maintain their inventories at certain levels to facilitate customer demand, which leads to multiple inventories of identical products. This is very costly to the manufacturer because of the time and energy which must be expended in keeping track of the plurality of inventories of the same product A and additionally there are significant expenses incurred in storing the inventories of the same product.

It would be desirable to have a security device that solves the problem manufacturers have associated with carrying and storing multiple inventories of the identical product. It would also be desirable if the security device was easy to use and inexpensive to manufacture.

SUMMARY

The present invention is for a dual security label. The dual security label comprises a cover stock body comprising a first side and a second side. The dual security label further comprises an adhesive that has been applied to the second side of the cover stock body. Two antitheft devices are adhered to the adhesive. These antitheft devices are an acousto-magnetic (AM) antitheft device and a radio frequency (RF) antitheft device. The AM antitheft device and RF antitheft device cannot touch one another and are separated by a distance of about 0.25 inches or more. Interference becomes problematic if the AM antitheft device and RF antitheft device touch or if the distance between them is less than about 0.25 inches. In addition, a radio frequency identification device may be substituted for one of the antitheft devices or used in combination with the two antitheft devices. The radio frequency identification device should not contact the radio frequency antitheft device or acousto-magnetic antitheft device.

The dual security label is made by the following process:

a) a release liner or web made of polyester or other suitable material is provided, b) one side of the release liner or web is the silicone side and has a silicone coating and the other side of the release liner is the metallized side and has a metallized coating, c) antitheft sensors or devices (acousto-magnetic antitheft devices and radio frequency antitheft devices) and/or radio frequency identification sensors are applied to the silicone side, such that when the cover stock is applied the sensors will release from the web liner and travel with the cover stock when being applied to the finished product, d) the metallized coating on the metallized side of the release liner is used for grounding the web so that static electricity does not build up which could be problematic for the radio frequency antitheft devices, e) the antitheft devices and/or sensors are laid in a pattern on the silicone coating on the silicone side of the release liner so that they can be applied to a finished retail product, and in particular the acousto-magnetic antitheft device and radio frequency antitheft device do not touch one another and are separated from one another by a distance of about 0.25 inches or more, f) the two antitheft devices travel down the release liner web and a cover stock having a one side self adhesive is applied over the sensors and release liner with the adhesive layer second side of the cover stock being applied on top of the sensors and the web, g) the web then travels over a rotary cutting device that cuts the cover stock without cutting the release web, h) the web and cover stock travel to a rewind wheel which rolls the release web carrying the dual security labels onto a roll format making the dual security labels ready for production, i) the finished product is a roll of the release liner with about 5,000 dual security labels having the cover stock applied to them, and j) the roll of dual security labels is used in an automatic application process wherein the cover stock carries/pulls the sensors off the release liner and onto a finished manufactured product to which the dual security label is to be applied. It is noted that because the adhesive of the cover stock is strong enough to pull the sensors off the silicone coating on the silicone side of the release liner the security labels are maintained in correct format to be applied to the finished product.

In another embodiment, a triple security label is provided for that includes an acousto-magnetic antitheft device, a radio frequency antitheft device, and a radio frequency identification device. Here, the assembly process includes the additional step of applying the radio frequency identification device to the silicone coating on the silicone side of the release liner.

In other embodiments an enclosing member is provided. The enclosing member has a first and second side, and the first side is coated with an adhesive. The enclosing member is adhered to the stock enclosing member, such that the first antitheft device and second antitheft device are positioned between or sandwiched between the enclosing member and cover stock body.

The dual security label does away with the need for manufactures to keep multiple inventories. The manufactured receives an order from a retailer that has a known security system. All the manufacture needs to do is run the product through deactivation machines that deactivate one of the security devices, while keeping the security device required for the particular retailer active. This deactivation can be readily accomplished in deactivation machines.

Thus, the manufacturer only needs to keep one inventory, and as a result the costs and expenses associated with maintaining multiple inventories is no longer problematic for the manufacturer.

DESCRIPTION OF THE FIGURES

This invention is illustrated in the drawings in which like reference numbers designate the same or similar parts.

DESCRIPTION

Figure 1:
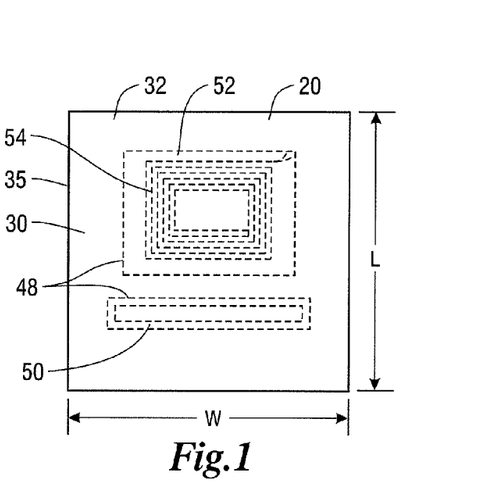
FIG. 1 shows a front elevational view of the dual security label.
Figure 2:
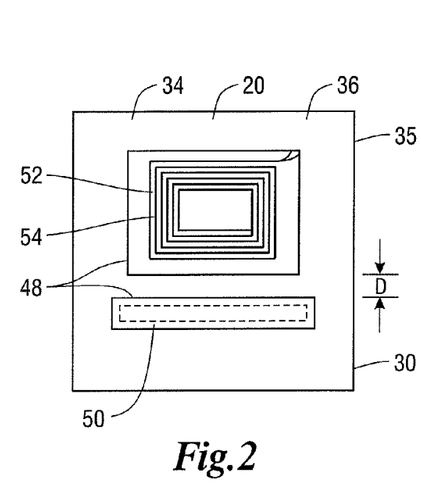
FIG. 2 shows a rear elevational view of the dual security label.

Turning to FIGS. 1-5, shown therein is a dual security label 20. FIG. 1 shows a front elevational view of the dual security label 20, and FIG. 2 shows a rear elevational view of the of the dual security label 20. The dual security label 20 comprises a cover stock body 30. The cover stock body 30 comprises a first side 32, a second side 34, and a peripheral edge 35, as shown in FIGS. 1-5. The cover stock body 30 further comprises a length designed L and width designated W, as shown in FIG. 1. The cover stock body 30 can comprise paper, coated paper products, woven fabrics, nonwoven fabrics, plastics, polyethylene and polyethylene films, and polyester and polyester blends, and combinations thereof. Also, the first side 32 of the cover stock body 30 can have written indicia thereon to disguise the dual security label 20 or to carry information, for example a UPC (universal product code) directing the retailer where the dual security label 20 is embedded in the product being sold.

The second side 34 of the cover stock body 30 is coated with an adhesive 36. Adhesives are well known to those having ordinary skill in the art.

Figure 3:
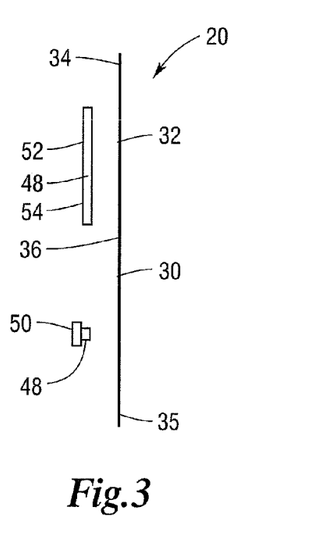
FIG. 3 shows an exploded left side elevational view of the dual security label.
Figure 4:
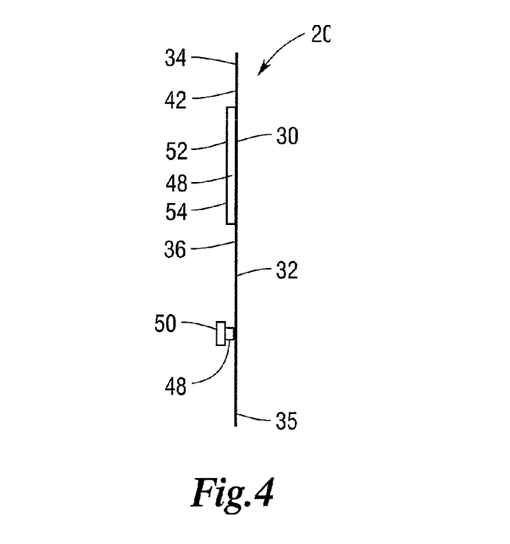
FIG. 4 shows a left side elevational view of the dual security label.
Figure 5:
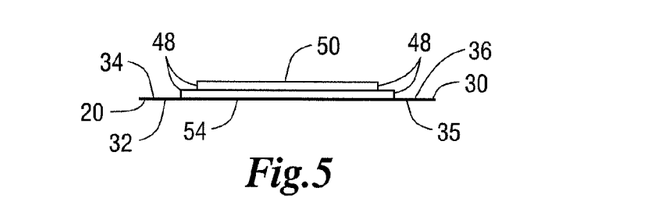
FIG. 5 shows a top plan view of the dual security label.

The antitheft devices, commonly designated 48 throughout the figures, are adhered to the adhesive 36, as shown in FIGS. 1-2 and 4-5. This is accomplished by placing the antitheft devices 48 on the adhesive 36 in a manner to be described presently. FIG. 3 shows an exploded left side elevation view of the dual security label 20, detailing the components thereof.

Figure 9:
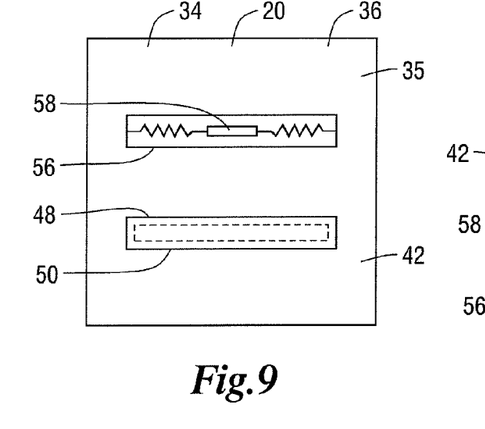
FIG. 9 is a rear elevational view of another embodiment of the security label having an acousto-magnetic antitheft device and radio frequency identification device.
Figure 10:
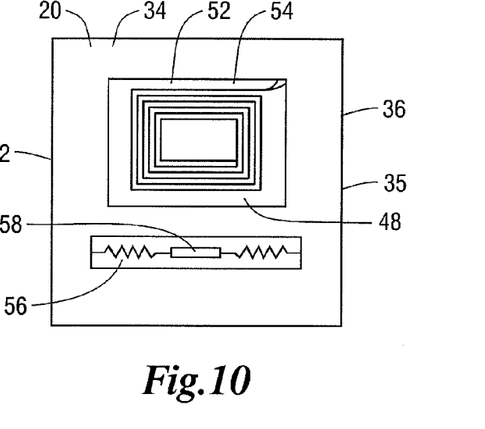
FIG. 10 is a rear elevational view of another embodiment of the label having a radio frequency antitheft device and a radio frequency identification device.

One of the antitheft sensors or devices 48 is an acousto-magnetic (AM) antitheft device 50 (hereinafter AM antitheft device 50) and the other antitheft device or sensor 48 is a radio frequency (RF) antitheft device 52 (hereinafter RF antitheft device 52. Also, the present invention provides for a radio frequency identification (RFID) device or sensor 56 (hereinafter RFID sensor 56) that has a chip 58 for storing information, as shown in FIG. 9.). AM antitheft devices 50, RF antitheft devices 52, and RFID devices 56 are all well known to those having ordinary skill in the art, and the means for detecting these antitheft devices 48 and RFID devices 56 are commercially available and are well known to those having ordinary skill in the art. The dual security label 20 can comprise any two of the antitheft devices 48. In particular, the dual security label 20 can have an AM antitheft device 50 and a RF antitheft device 52 (FIGS. 1 and 2). In other embodiments, the dual security label 20 may comprise an AM antitheft device 50 and a RFID sensor 56 (FIG. 9), or a RF antitheft device 52 and an RFID sensor 56 (FIG. 10).

There is a specific relationship between the spacing between the AM antitheft device 50 and RF antitheft device 52. First, the AM antitheft device 50 and RF antitheft device 52 cannot touch one when used in the dual security label 20. In particular, the AM antitheft device 50 and RF antitheft device 52 need to be spaced from one another by a distance of about a 0.25 inches or more when they are used in the dual security label 20. In FIG. 1 the distance is designated by D is shown. If the spacing between the AM antitheft device 50 and RF antitheft device 52 is closer than about 0.25 inches, then signal interference becomes problematic.

In use, the manufacturer may receive an order from one of the retailers it distributes product to, and the retailer may have an acousto-magnetic (AM) security system and may thus require the products it sells to be equipped with acousto-magnetic (AM) antitheft devices 50. All the manufacturer needs to do is deactivate the radio frequency (RF) antitheft devices 52 that are adhered to the adhesive 36 on the second side 34 of the cover stock body 30 by use of a deactivation machines. Such deactivation machines are well known to those having ordinary skill in the art. Then, the manufacturer ships the product having activated acousto-magnetic antitheft (AM) devices 50 to the retailer.

Or, the manufacturer may receive an order from a different retailer that it distributes product to, and this retailer may have a radio frequency (RF) security system that requires the products it sells to be equipped with radio frequency (RF) antitheft devices 52. All the manufacturer needs to do is deactivate the acousto-magnetic antitheft devices 50 in a deactivation machine. Such deactivation machines are well known to those having ordinary skill in the art. Then, the manufacture can ship the product having radio frequency (RF) antitheft devices 52 to the retailer.

Figure 13:
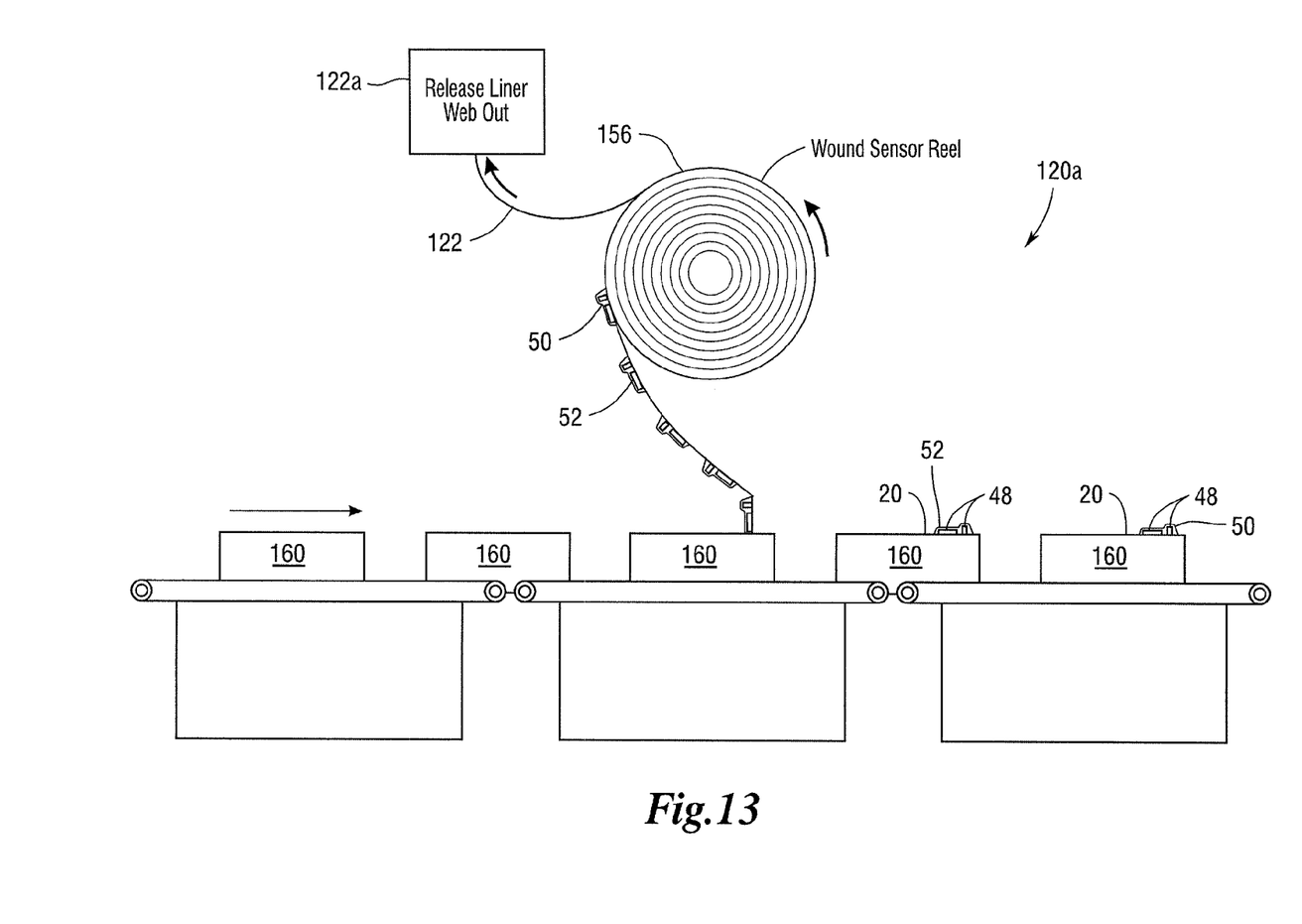
FIG. 13 shows a diagrammatic view of the application machine wherein the dual security labels are applied to products to be sold.

The dual security label 20 may be attached to a product in a plurality of manners. At the most basic level, the dual security label 20 may be sold as a single label 20, and the user peels the dual security label 20 off a removable backing. The removable backing is made of a material that does not bond to adhesives, such materials known to those having ordinary skill in the art. The user then manually places (sticks) the dual security label 20 on the product to be sold. A plurality of dual security labels 20 may also be sold on sheets, and the user simple peels off the dual security labels 20 from the backing and applies them to products as desired. There may be perhaps thirty labels 20 on each sheet. Or, the dual security labels 20 may be sold on rolls or festoons, each having hundreds or thousands of labels 20. The rolls or festoons could be used for the automatic application of dual security labels 20 on the customer's or vendor's product line, as shown in FIG. 13. As the spools or festoons are fed into the application tools/machines, the backing is removed and the labels 20 are applied to the product. In other embodiments the entire application process using application tools could be computerized, thus providing for the constant application of labels 20 on products in a quick and precise manner. Thus, the spools and festoons greatly increases the utility of the dual security labels 20 to manufacturers and vendors.

Figure 12:
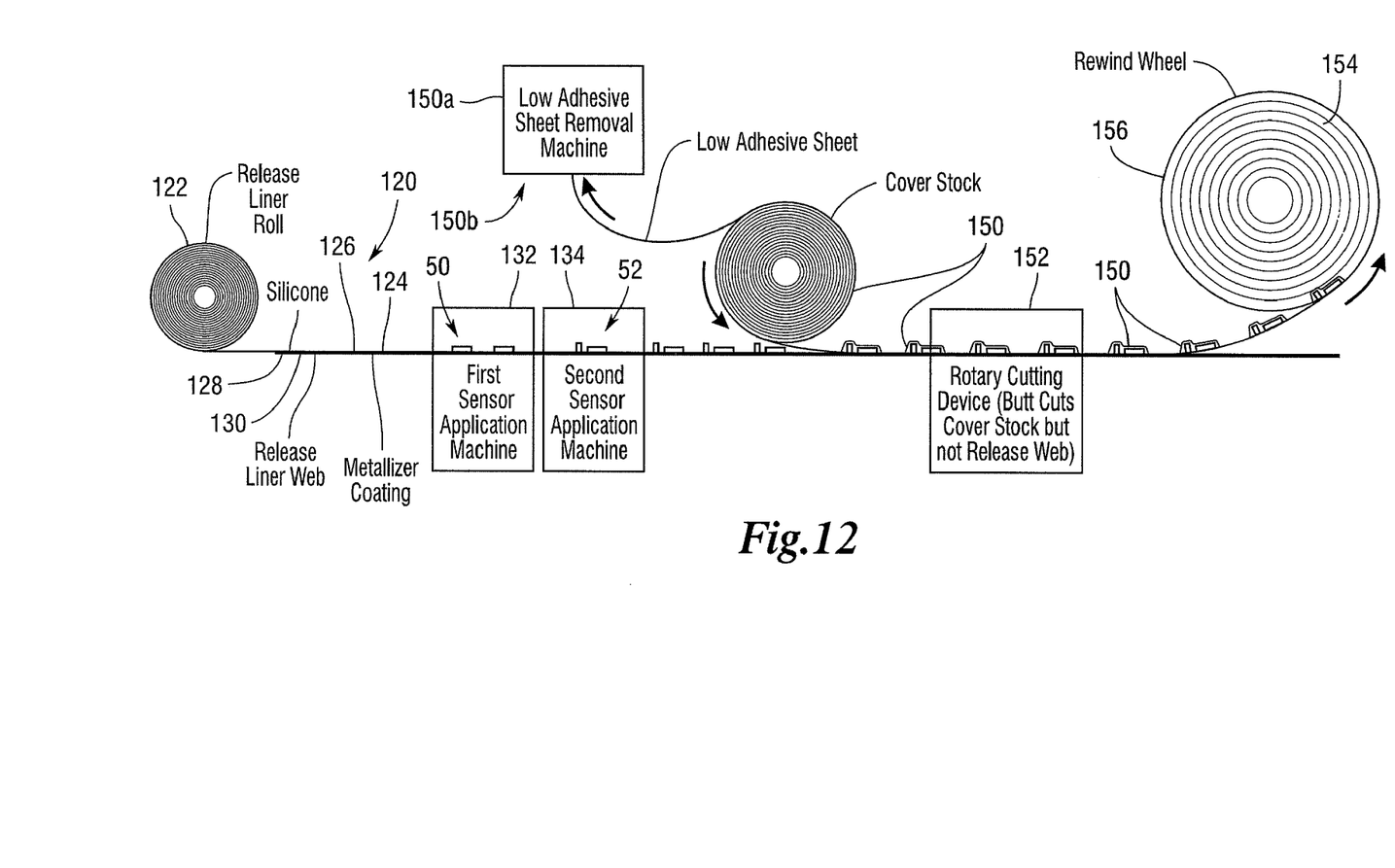
FIG. 12 shows a diagrammatic view of the production machine for manufacturing the dual security labels.

Finally, the process of making the dual security label 20 and applying the dual security labels 20 can be entirely automated, as shown in the diagrammatic view of FIG. 12. FIG. 12 shows an production machine or line 120 used for making the dual security labels 20. FIG. 13 shows the application process wherein the application machine 120*a* adheres the dual security label 20 on the products 160 to be sold.

Production begins with a roll of release liner or web 122. The release liner or web 122 can be made of polyester or other suitable material known to those skilled in the art. A silicone side 124 of the release liner or web 122 has a silicon coating 126, and a metallized side 128 of the release liner 124 has metallized coating 130. Antitheft sensors or devices 48 (acousto-magnetic antitheft devices and radio frequency antitheft devices) and/or radio frequency identification devices are applied to the silicone side 124. It is noted that the metallized coating 130 on the release liner 122 is used for grounding the release liner or web 122 so that static electricity does not build up which could be problematic. For example, build up static electricity can cause shorts in the RF antitheft device 52, but the grounded metallized coating 130 prevents such short circuits. Thus, the metallized coating 130 is used for grounding and used for preventing electrical damage.

The antitheft devices 48 are automatically laid in a pattern on the silicone side 124 of the release liner 122 so that they can be applied to a finished retail product. A first sensor application machine 132 applies the acousto-magnetic antitheft device 52 on the silicone side 124 and a second sensor application machine 134 applies the radio frequency antitheft device 52 to the silicone side 124. The first and second sensor application machines 132,134 respectively, apply the acousto-magnetic antitheft device 50 and radio frequency antitheft device 52 on the silicone side 124 of the release line 122 such that they are spaced a distance of about 0.25 inches from one another. Sensor application machines are commercially available and known to those having ordinary skill in the art. The two antitheft devices 48 travel down the release liner web 122. A roll of cover stock 150 having an adhesive layer and from which the cover stock bodies 30 will be cut is applied over the antitheft devices 48 and over the release liner 122. Also, a low adhesive sheet 150*b* is removed from the roll of cover stock 150 by a low adhesive sheet removal machine 150*a* to thus expose the adhesive on the roll of cover stock 150.

The web 122 travels over a rotary cutting machine 152 that cuts the cover stock 150 without cutting the release web 122. Rotary cutting machines are known to those having ordinary skill in the art. The web 122 and cover stock 150 then travel to a rewind wheel 154 that rolls the release web 122, which is carrying the antitheft devices 48, onto a roll format 156 making the dual security labels 20 ready for vendors to apply the dual security labels 20. Rewind machines known to those having ordinary skill in the art.

The finished product is a roll 156 has about 5,000 dual security labels 20 having the cover stock bodies 30 applied to them. As shown in FIG. 13, in the automatic application line 120*a*, the dual security roll 156 is used in an automatic application process wherein the cover stock 150, which has been cut, carries the antitheft devices 48 off of the release liner 122 and onto a finished manufactured product 160 as shown in FIG. 12. It is noted that the adhesive on the roll of cover stock 150 is strong enough to pull the antitheft devices 48 off the silicone side 124 of the release liner 122 which keeps the dual security labels 20 in correct format to be applied to the finished product 160. The release liner 122 is removed automatically by a release liner removal machine 122*a* is wound on a reel or spindle.

Of course, in the above-described assembly process, it is noted that either of the antitheft devices 48 could be replaced with a RFID sensor 56, and the same process as described above followed could be followed to attach them to the web liner 122.

Thus, by attaching two different antitheft devices 48 to the adhesive layer second side 42 the manufacturer can activate and deactivate the desired antitheft device 48 before shipment to each retail store. Hence, by use of the dual security label 20, the manufacturer no longer has to maintain costly multiple inventories.

Figure 7:
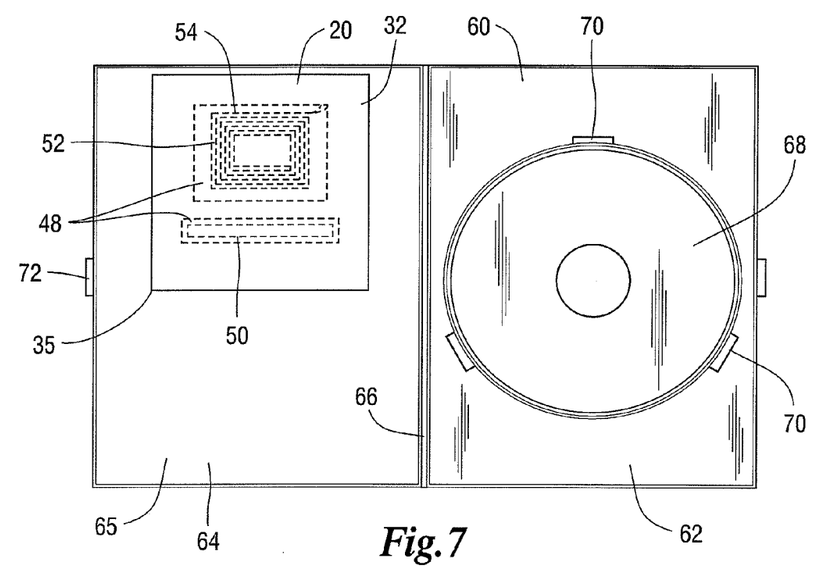
FIG. 7 is a front elevational view of a digital video disc case with dual security label.
Figure 8:
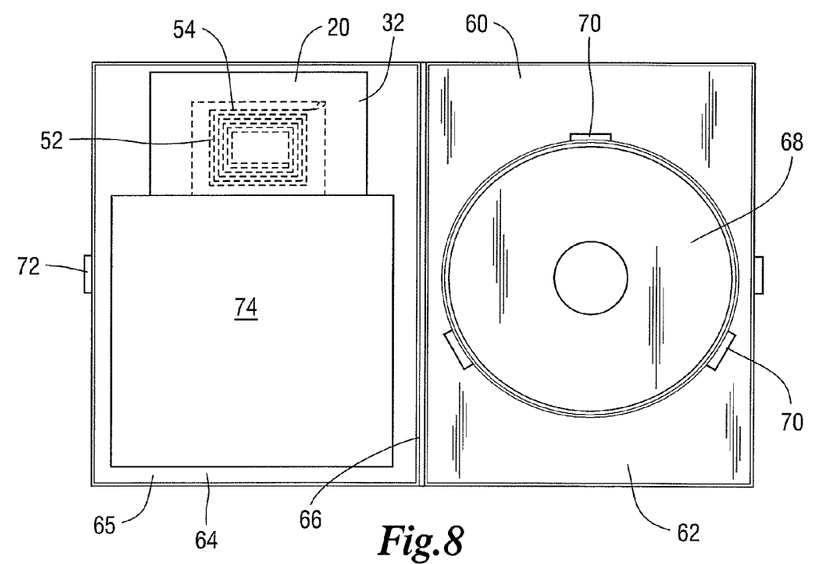
FIG. 8 is a front elevational view of a digital video disc case that includes product information.

The manufacturer can then use this dual security label 20 and attach it to the product it is shipping to various retailers. An illustrative example of use of the dual security label 20 is shown in connection with a digital video disc (hereinafter DVD) case 60 as shown in FIG. 7. A DVD 68 is the product being sold by the manufacturer. The DVD case 60 comprises a base 62, a cover 64, and a hinge 66 connecting the base 62 and cover 64. The cover 64 has an inside surface 65. The DVD 68 is shown supported on the base 62, and secured on the base 62 by a means for securing 70 extending from the base 62. There is also a means for closing 72 attached to the cover 64 and base 62 and used for keeping the case 60 closed when the cover 64 and base 62 are folded toward one another along the hinge 66 and contact one another. As shown, the cover stock body 30 is secured to the inside surface 65 of the cover 64 because the adhesive layer second side 42 is adhered to the inside surface 65. As show there are two antitheft devices 48 adhered to the DVD case 60. One is the AM 50 antitheft device and the other is the RF 52 antitheft device. Of course, in other configurations, described above, different pairs of antitheft devices 48 can be adhered to the inside surface 65 of the cover 64. FIG. 8 shows a front elevational view of an open DVD case 60 wherein product literature 74 is included, partly covering the security label 20.

Figure 11:
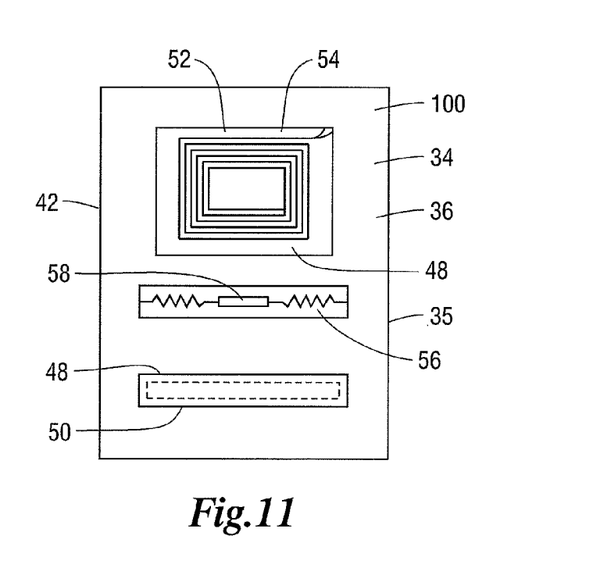
FIG. 11 is a rear elevational view of the triple security label having a an acousto-magnetic antitheft device a radio frequency identification device and a radio frequency antitheft device.

In another embodiment, shown in FIG. 11, a triple security label 100 is provided for in which two antitheft devices 48 and a RFID sensor 56 are employed and adhered to the adhesive 36 on the second side 34 of the cover stock body 30. The antitheft devices 48 include the AM antitheft device 50 and RF antitheft device 52. As previously described, one of the antitheft devices 48 is deactivated before the products to which they are adhered are shipped to the retailer. In this embodiment, the adhesive 36 supports the two antitheft devices 48, and the RFID sensor 56. The adhesive 36 is placed against the product 160 to be sold, and it adheres thereto. To make such a triple security label 100, the assembly line 20 shown in FIG. 12 has added to it a RFID sensor application machine (not show), which is adjacent to the first and second sensor application machines 132, 134 respectively. Such machines are well known to those having ordinary skill in the art and are commercially available.

Figure 6:
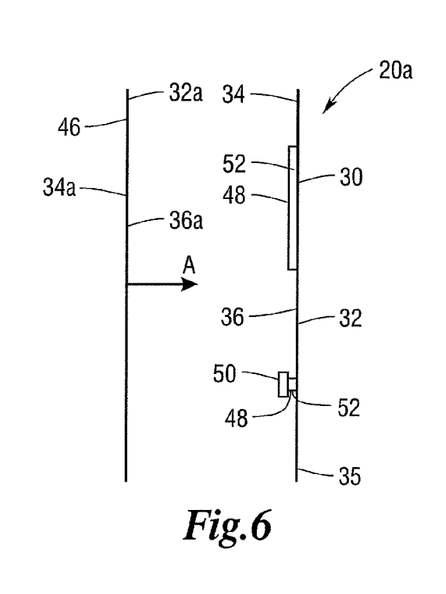
FIG. 6 shows a left side elevational view of the dual security label and enclosing member.

In yet another embodiment, shown in FIG. 6, a covered dual security label 20a is provided that has an enclosing member 46, as shown in FIG. 6. Here the enclosing member 46 adheres or bonds strongly with the cover stock body 30. The enclosing member 46 has a first side 32a and a second side 34a. An the first side 32a of the cover stock body 30 is coated with an adhesive 36. To cover the antitheft devices 48 the first side 32a of the enclosing member 46 is moved in the direction indicated by arrow A toward the cover stock body 30. The enclosing member 46 thus contacts and adheres to the cover stock body 30 and the antitheft devices 48. After contact, no adhesive is exposed and the antitheft devices 48 (AM antitheft device 50 and RF antitheft device 52) are enclosed between the cover stock body 30 and enclosing member 46. The covered dual security label 20a is ready for use. An AM antitheft device 50 and a RFID sensor 56, or a RF antitheft device 52 and a RFID sensor 56 also be enclosed and covered in the same manner.

Figure 6A:
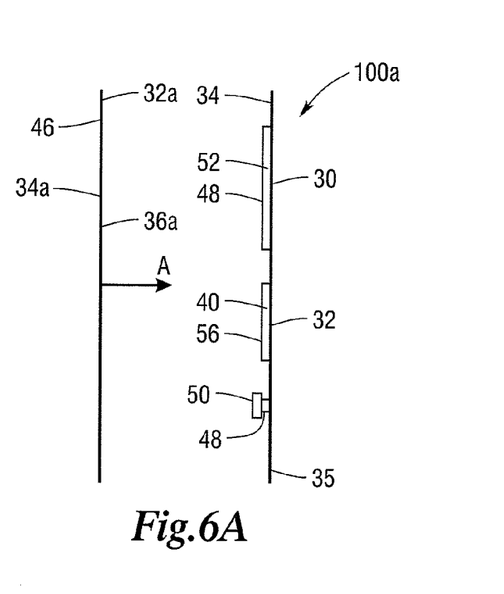
FIG. 6A shows a left side elevational view of the triple security label and enclosing member.

Also, in another embodiment, shown in FIG. 6A, a covered triple security label 100a is provided with a enclosing member 46. In particular, the enclosing member 46 adheres or bonds strongly with the cover stock body 30. The enclosing member 46 has a first side 32a and a second side 34a. A second self adhesive strip 36a having a adhesive layer first side 40a and adhesive layer second side adhesive 42a is provided, and adhered to the first side 32a of the enclosing member 46. Then, the second side 32a of the enclosing member 46 is moved in the direction indicated by arrow A toward the cover stock body 30. The enclosing member 46 then contacts and adheres to the cover stock body 30 and the antitheft devices 48 and RFID sensor 56. After contact, no adhesive is exposed and the antitheft devices 48 and RFID device 56 are enclosed between the cover stock body 30 and enclosing member 46. The covered triple security label 100a is ready for use.

Then, after the enclosing member 46 has been adhered to the cover stock body 30, the covered dual security label 20a or covered triple security label 100a can be deposited in the packaging used in connection with the products being sold.

It is noted that the cover stock body 30 and enclosing member 46 can comprise paper, fabric, coated paper products, woven fabrics, nonwoven fabrics, plastics, polyethylene and polyethylene films, and polyester and polyester blends, blown polyester, and combinations thereof, all of which allow the antitheft devices 48 to be carried thereon. Also, both the cover stock body 30 and enclosing member 46, respectively, are designed to carry a print that allows the end user to either disguise the covered dual security label 20a or covered triple security label 100a or to carry other information, such as a UPC (universal pricing code) directing the retailer where the covered dual security label 20a or covered triple security label 100a is embedded. Additionally, manufacturers can configure their product lines such that the covered dual and triple security labels, 20a, 100a, respectively, automatically drop into the product packaging.

It will be appreciated by those skilled in the art that while dual security label has been described above in connection with particular embodiments and examples, the dual security label is not necessarily so limited and other embodiments, examples, uses, and modifications and departures from the embodiments, examples, and uses may be made without departing from the dual security label. All of these embodiments are intended to be within the scope and spirit of the this dual security label.

What is claimed is:

1. A dual security label comprising:
   a) a cover stock body comprising a first side and a second side wherein the second side is coated with an adhesive,
   b) a first antitheft device adhered to the adhesive on the second side of the cover stock body and wherein the first antitheft device is an acousto-magnetic antitheft device, and
   c) a second antitheft device adhered to the adhesive on the second side of the cover stock body and wherein the second antitheft device is a radio frequency antitheft device.

2. The dual security label according to claim 1 wherein the acousto-magnetic antitheft device and the radio frequency antitheft device are separated from one another by a distance of about 0.25 inches.

3. The dual security label according to claim 1 further comprising a radio frequency identification device having a chip for storing information adhered to the adhesive.

4. The dual security label according to claim 1 wherein the cover stock body comprises polyester and polyester blends.

5. The dual security label according to claim 1 further comprising a enclosing member having a first side and a second side and wherein the first side is coated with an adhesive and wherein the enclosing member adheres to the adhesive on the second side of the cover stock body such that the first antitheft device and second antitheft device are secured therebetween.

6. The dual security label according to claim 5 further comprising a radio frequency identification device for storing information adhered between the enclosing member and the cover stock body.

7. A method for making a dual security label for securing a product, the method comprising:
   a) providing a release liner having a silicone side and a metallized side for grounding the release liner and preventing the build up of static electricity,
   b) providing a first antitheft device and a second antitheft device and applying the first and second antitheft devices on the silicone side of the release liner,
   c) providing a cover stock body and applying the cover stock body over the first and second antitheft devices and the silicone side of the release liner and wherein the cover stock body has an adhesive, and
   d) removing the release liner and applying the dual security label to the product.

8. The method according to claim 7 comprising the further steps of using an acousto-magnetic antitheft device for the first antitheft device and using a radio frequency antitheft device for the second antitheft device.

9. The method according to claim 8 comprising the further step of providing a distance between the acousto-magnetic antitheft device and radio frequency antitheft device of about 0.25 inches.

10. The method according to claim 7 comprising the further step of providing a radio frequency identification device having a chip for storing information and adhering the radio frequency identification device to the adhesive layer second side.

11. The method according to claim 7 comprising the further steps of providing a enclosing member having a first side and a second side and providing an adhesive on the first side of the enclosing member and adhering the enclosing member to the adhesive on the stock cover body such that the antitheft devices are secured therebetween.

12. A method of making dual security labels comprising the steps of:
   providing a roll of release liner and unwinding the roll of release liner and running it through a first sensor application machine and applying a first antitheft device to the release liner,
   providing a second sensor application machine and applying a second antitheft device to the release liner,
   providing a roll of cover stock having an adhesive and applying the cover stock over the first and second sensors,
   providing a cutting machine and cutting the cover stock without cutting the release liner to form dual security labels,
   providing a rewind wheel and winding the dual security labels in a roll.

13. The method of making dual security labels according to claim 12 comprising the further steps of providing the release liner with a metallized side and a silicone side and applying the first antitheft device and second antitheft device to the silicone side of the release liner.

14. The method of making dual security labels according to claim 13 wherein the metallized side of the release liner is used for reducing static electricity build up.

15. The method of making dual security labels according to claim 12 comprising the further steps of using an acousto-magnetic antitheft device for the first antitheft device and using a radio frequency antitheft device for the second antitheft device.

16. The method of making dual security labels according to claim 15 comprising the further step of providing a distance between the acousto-magnetic antitheft device and radio frequency antitheft device of about 0.25 inches.

17. The method of making dual security labels according to claim 15 comprising the further steps of providing deactivation machines and deactivating either the acousto-magnetic antitheft device or radio frequency antitheft device before shipping the products to be sold to retailers.

18. The method of making dual security according to claim 12 comprising the further steps of providing a third sensor application machine for applying radio frequency identification devices to the dual security label.

19. A method of making dual security labels according to claim 12 comprising the further steps of automatically unwinding the roll of dual security labels and removing the release liner and adhering the dual security labels to products to be sold.

20. A dual security label comprising:
   a) a cover stock body comprising a first side and a second side wherein the second side is coated with an adhesive,
   b) a first antitheft device adhered to the adhesive on the second side of the cover stock body,
   c) a second antitheft device adhered to the adhesive on the second side of the cover stock body,
   d) and wherein the first antitheft device is an acousto-magnetic antitheft device and the second antitheft device is a radio frequency antitheft device, and
   e) wherein the cover stock body is adhered to a product to be sold by the adhesive and wherein either of the acousto-magnetic antitheft device or the radio frequency antitheft device is deactivated prior to shipment of the product.

21. A method for making a security label comprising the steps of:
   a) providing a cover stock body comprising a first side and a second side,
   b) providing an adhesive and applying the adhesive to the second side of the cover stock body,
   c) providing a first antitheft device and adhering the first antitheft device to the adhesive,
   d) providing a second antitheft device and adhering the second antitheft device to the adhesive, and
   e) attaching the cover stock body to a product to be sold by the adhesive and deactivating one of the acousto-magnetic antitheft device or radio frequency antitheft device prior to shipping the product.

* * * * *